United States Patent
Sueyoshi et al.

(10) Patent No.: US 8,403,335 B2
(45) Date of Patent: Mar. 26, 2013

(54) LIQUID-OPERATED CYLINDER

(75) Inventors: Daisuke Sueyoshi, Kani (JP); Daisuke Tanaka, Gifu (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 12/805,705

(22) Filed: Aug. 16, 2010

(65) Prior Publication Data

US 2011/0049811 A1    Mar. 3, 2011

(30) Foreign Application Priority Data

Aug. 26, 2009 (JP) .................................. 2009-195214

(51) Int. Cl.
*F16J 15/46* (2006.01)
(52) U.S. Cl. ........................................ 277/437; 277/467
(58) Field of Classification Search .................. 277/435, 277/437, 467
See application file for complete search history.

(56) References Cited

U.S. PATENT DOCUMENTS

| | | | | | |
|---|---|---|---|---|---|
| 4,121,838 | A | * | 10/1978 | Sakamaki | 277/586 |
| 5,474,307 | A | * | 12/1995 | DeBiasse et al. | 277/451 |
| 6,454,273 | B1 | * | 9/2002 | Kashima et al. | 277/437 |

FOREIGN PATENT DOCUMENTS

| JP | 10-122205 A | 5/1998 |
|---|---|---|
| JP | 2000-002207 A | 1/2000 |

* cited by examiner

*Primary Examiner* — Gilbert Lee
(74) *Attorney, Agent, or Firm* — Rabin & Berdo, P.C.

(57) ABSTRACT

A piston seal of a liquid-operated cylinder includes a main seal ring that slidably contacts the inner circumferential surface of the cylinder tube; an O-ring that imparts a force causing an outer circumference of the main seal ring to move closer to the inner circumferential surface of the cylinder tube by pressing onto an inner circumference of the main seal ring; and a sub-seal ring that is disposed parallel to the main seal ring at a position further toward the cushion pressure chamber and is pressed by the main seal ring, as pressure from the drive pressure chamber is applied to the main seal ring, to slidably contact the inner circumferential surface of the cylinder tube.

2 Claims, 5 Drawing Sheets

LIQUID-OPERATED CYLINDER

FIELD OF THE INVENTION

This invention relates to a direct-acting liquid-operated cylinder (such as a hydraulic cylinder) at which a cushion pressure is imparted near an extending stroke end.

BACKGROUND OF THE INVENTION

A shock is likely to occur as a direct-acting hydraulic cylinder (lift cylinder) disposed at a forklift and used to lift a load becomes fully extended and stops. The shock is usually damped with a cushion pressure imparted near the end of an extending stroke.

This type of hydraulic cylinder includes a piston seal (seal ring) disposed on the outer circumference of a piston. The piston seal partitions a cushion pressure chamber so as to allow a hydraulic fluid to be collected into the cushion pressure chamber in a quantity required to create the cushion pressure.

The following is a description of the structures adopted in piston seals included in this type of direct-acting hydraulic cylinder in the related art.

The piston seal disclosed in JP 2000-2207A includes a seal ring that slidably contacts an inner circumferential surface of a cylinder tube and an O-ring that presses the seal ring against the inner circumferential surface of the cylinder tube.

The seal ring and the O-ring are mounted side-by-side in a housing groove located on the outer circumferential side of the piston, so as to form a straight line with respect to the radius of the piston.

When the piston moves up during an extending operation of a hydraulic cylinder, an elastic restorative force of the O-ring presses the seal ring against the inner circumferential surface of the cylinder tube and a cushion pressure is thus created.

The piston seal disclosed in JP10-122205A includes a rubber seal ring in slidable contact with an inner circumferential surface of a cylinder tube and a backup ring constituted of resin.

The seal ring and the backup ring are mounted side-by-side along the axis of the piston within a housing groove located on the outer circumferential side of the piston.

When the piston moves up during an extending operation of a hydraulic cylinder, the elastic restorative force of the rubber seal ring causes it to be pressed against the inner circumferential surface of the cylinder tube and a cushion pressure is thus created.

At this time, the backup ring comes into contact with the seal ring and thus prevents the rubber seal ring from being pulled out of the housing groove.

SUMMARY OF THE INVENTION

There is still an issue that the piston seal structures in the related art discussed above fail to address effectively, in that the piston seal may fail to sufficiently wipe off an oil film as the piston moves up during the hydraulic cylinder extending operation.

In such a case, the quantity of hydraulic fluid flowing from the cushion pressure chamber into a drive pressure chamber located at a position lower than the piston during the hydraulic cylinder extending operation will be greater than the quantity of hydraulic fluid flowing from the drive pressure chamber into the cushion pressure chamber located at a position higher than the piston during a hydraulic cylinder contracting operation. This, in turn, may lead to a failure in collecting a sufficient quantity of hydraulic fluid in the cushion pressure chamber as the hydraulic cylinder extends and contracts repeatedly.

An object of this invention is to provide a liquid-operated cylinder that allows a hydraulic fluid to be collected and kept in a sufficient quantity in the cushion pressure chamber.

In order to achieve the above object, this invention provides a liquid-operated cylinder which is caused to extend by a pressurized hydraulic fluid guided into a drive pressure chamber. The liquid-operated cylinder comprises a cylinder tube; a piston that defines the drive pressure chamber and a cushion pressure chamber inside the cylinder tube; and a piston seal that is disposed at an outer circumference of the piston and slidably contacts an inner circumferential surface of the cylinder tube. The piston seal comprises a main seal ring that slidably contacts the inner circumferential surface of the cylinder tube; an O-ring that imparts a force causing an outer circumference of the main seal ring to move closer to the inner circumferential surface of the cylinder tube by pressing onto an inner circumference of the main seal ring; and a sub-seal ring that is disposed parallel to the main seal ring at a position further toward the cushion pressure chamber and is pressed by the main seal ring, as pressure from the drive pressure chamber is applied to the main seal ring, to slidably contact the inner circumferential surface of the cylinder tube.

The details as well as other features and advantages of this invention are set forth in the remainder of the specification and are shown in the accompanying drawings.

DESCRIPTION OF THE PREFERRED EMBODIMENTS

Figure 1:
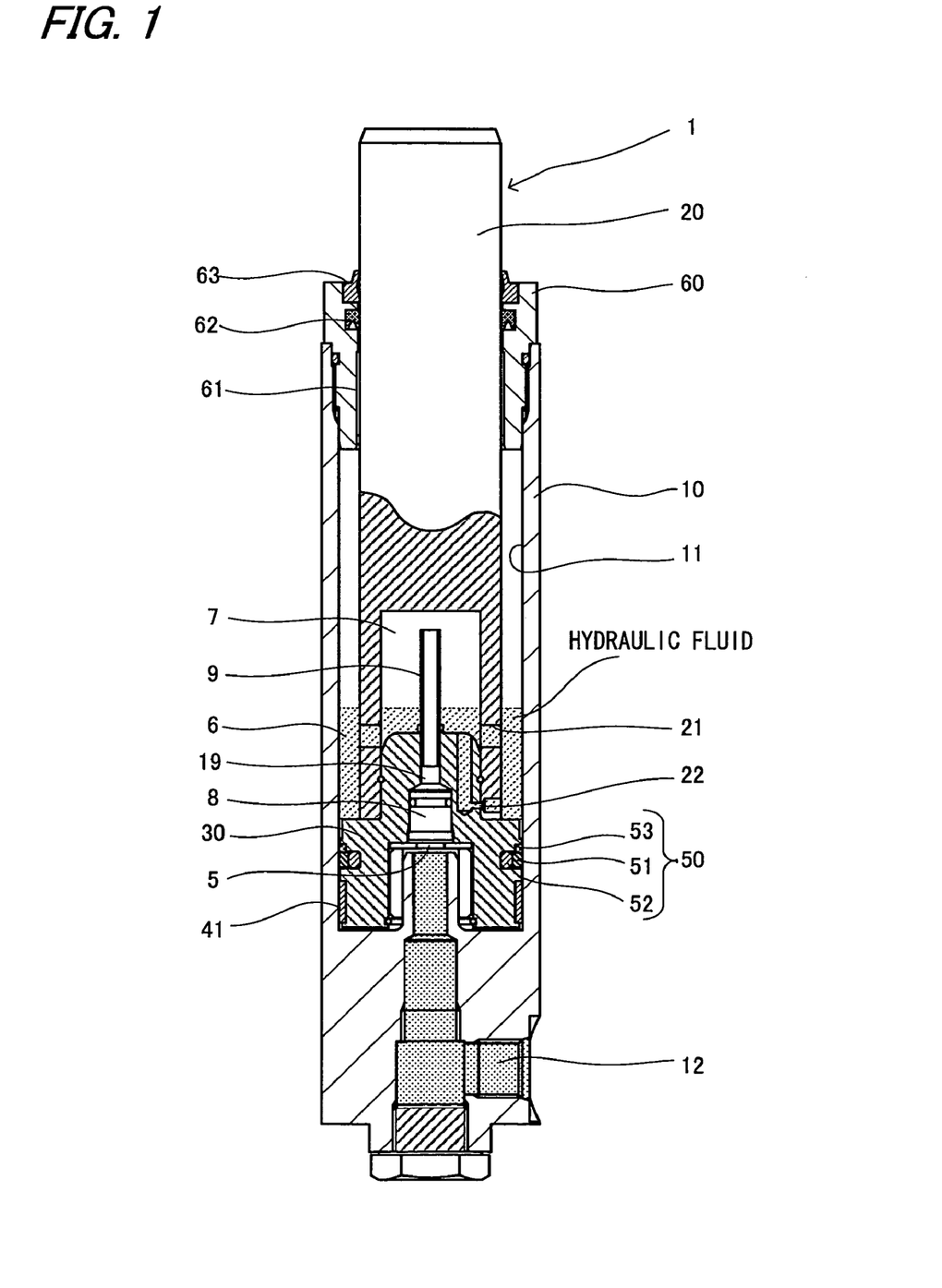
FIG. 1 is a sectional view of a liquid-operated cylinder achieved in an embodiment.

FIG. 1 is an overall view of a liquid-operated cylinder 1 in a longitudinal section. The liquid-operated cylinder may be, for instance, a hydraulic cylinder. The liquid-operated cylinder 1 may be used as a lift cylinder that raises and lowers a load in a forklift.

The liquid-operated cylinder 1 is mounted at a body so that a shaft of the liquid-operated cylinder extends along an up/down direction. The liquid-operated cylinder 1, which is a single-acting cylinder, includes a cylinder tube 10 supported by the body and a piston rod 20 linked to a fork that raises and lowers the load. A piston 30, disposed at a base end area of the piston rod 20, defines a drive pressure chamber 5 at the bottom of the cylinder tube 10.

A supply/discharge port 12 communicating with the drive pressure chamber 5 is formed at a base end portion of the cylinder tube 10, with a piping extending from a liquid pressure source (not shown) connected to the supply/discharge port 12.

A pressurized hydraulic fluid provided from the liquid pressure source (not shown) is guided through the piping into the drive pressure chamber 5. As the pressure of the hydraulic fluid guided into the drive pressure chamber 5 rises, the piston 30 is pushed upward, the piston rod 20 moves upward inside the cylinder tube 10 and the liquid-operated cylinder 1 is thus engaged in an extending operation. As the pressure of the hydraulic fluid guided into the drive pressure chamber 5 becomes lower, the dead weight and the load applied to the piston rod 20 causes a downward displacement of the piston rod 20, thereby engaging the liquid-operated cylinder 1 in a contracting operation. The liquid-operated cylinder 1 in FIG. 1 is at its most contracted, with the piston rod 20 positioned at the end of a contracting stroke.

While oil is used as the hydraulic fluid in the liquid-operated cylinder 1, an alternative operating fluid such as a water-soluble liquid, instead of oil, may be used.

A cylinder head 60, assuming a cylindrical shape, is connected to an open end on the upper side of the cylinder tube 10. A cylindrical bearing 61 is fitted at the inner circumference of the cylinder head 60. The bearing 61 slidably supports the piston rod 20.

A bearing 41 is fitted on the outer circumference of the piston 30. The piston 30 slidably contacts the inner circumferential surface 11 of the cylinder tube 10 via the bearing 41.

The bearing 61 at the cylinder head 60 slidably contacts the outer circumferential surface of the piston rod 20. In addition, the bearing 41 at the piston 30 slidably contacts the inner circumferential surface 11 of the cylinder tube 10. Thus, the piston rod 20 is supported so as to be allowed to move along the axis of the cylinder tube 10.

Figure 2:
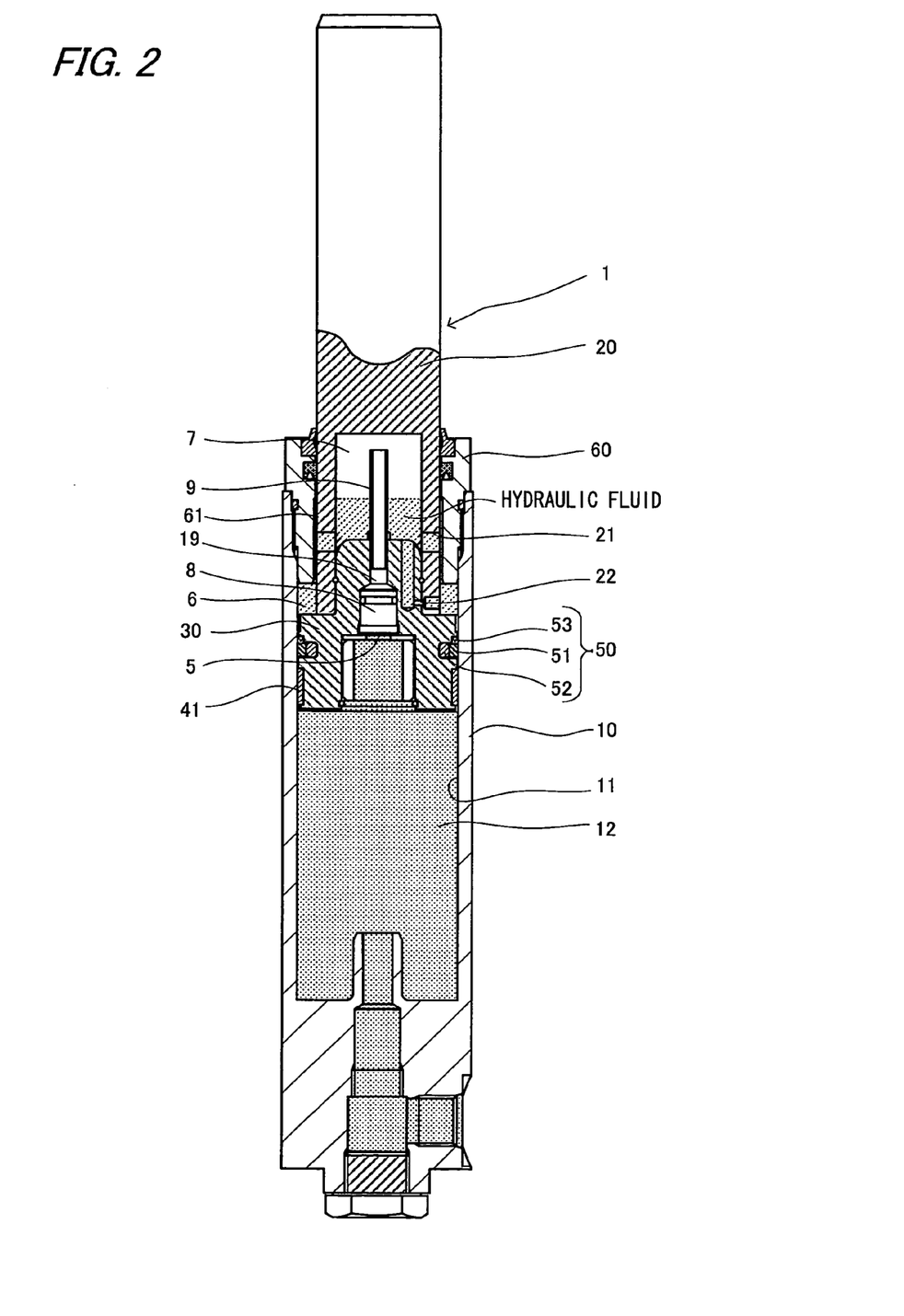
FIG. 2 is a sectional view of the liquid-operated cylinder in an extended state.

The piston rod 20 is hollow toward the bottom thereof and an air chamber 7 is formed inside the hollow space. Between the inner circumference of the cylinder tube 10 and the outer circumference of the piston rod 20, a toroidal cushion pressure chamber 6 is defined by the piston 30 and the cylinder head 60. The air chamber 7 and the cushion pressure chamber 6, which are in communication with each other, are filled with a hydraulic fluid (cushioning oil) and air. The area hatched with dotted lines in FIGS. 1 and 2 is where the hydraulic fluid is collected in the air chamber 7 and the cushion pressure chamber 6.

At the inner circumference of the cylinder head 60, a head seal 62 and a dust seal 63 are disposed in this order from bottom to top so as to slidably contact an outer circumferential surface 28 of the piston rod 20. The cushion pressure chamber 6 is tightly sealed with the head seal 62 as detailed later. Entry of dust and the like is prevented by the dust seal 63.

A piston seal 50 is disposed at the outer circumference of the piston 30 at an upper position relative to the bearing 41. The piston seal 50 slidably contacts the inner circumferential surface 11 of the cylinder tube 10 and thus, the drive pressure chamber 5, located on the lower surface side of the piston 30, is partitioned from the cushion pressure chamber 6 located on the upper surface side of the piston 30.

At the piston rod 20, a port 21 and an orifice 22 set apart from the port 21 along the up/down direction, are formed so as to communicate between the cushion pressure chamber 6 and the air chamber 7. The orifice 22 is formed so that it takes up a position set as close as possible to the upper surface of the piston 30. The port 21 is formed so that its effective area is greater than the area of the orifice 22.

FIG. 2 shows the liquid-operated cylinder 1 in an extended state. As the liquid-operated cylinder 1 is engaged in an extending operation and the volumetric capacity of the cushion pressure chamber 6 becomes smaller, the hydraulic fluid flows out of the cushion pressure chamber 6 to travel to the air chamber 7 via the port 21 and the orifice 22. As the piston rod 20 approaches the end of an extending stroke, the port 21 becomes closed off with the lower end of the bearing 61 and the hydraulic fluid flowing out of the contracting cushion pressure chamber 6 enters the air chamber 7 exclusively via the orifice 22. As a resistance is applied at the orifice 22 to the flow of the hydraulic fluid traveling out of the cushion pressure chamber 6, the pressure in the cushion pressure chamber 6 (hereafter referred to as cushion pressure) rises. As a result, the extending speed of the piston rod 20 is reduced. Through these measures, the extent of shock occurring as the piston rod 20 reaches the end of the extending stroke, as shown in FIG. 2, is lessened.

A communicating passage 19 communicating between the air chamber 7 and the drive pressure chamber 5 is formed in the piston 30, with a check valve 8 mounted in the communicating passage 19. A valve element (ball) of the check valve 8 is pressed against a seat (not shown) with a force imparted from a spring and thus, the check valve 8 remains closed as long as the pressure in the drive pressure chamber 5 is higher than the pressure in the air chamber 7. However, when the pressure in the air chamber 7 rises and the pressure difference between the pressure in the air chamber 7 and the pressure in the drive pressure chamber 5 exceeds a predetermined valve-opening pressure, the valve element departs the seat.

A return pipe 9, disposed so as to project out from the piston 30 into the air chamber 7, is connected to an inflow port of the communicating passage 19. The quantity of the effective hydraulic fluid collected in the cushion pressure chamber 6 and the air chamber 7 is regulated in correspondence to the height of the return pipe 9.

The hydraulic fluid having a high pressure, which is supplied into the drive pressure chamber 5 in order to bring the liquid-operated cylinder 1 into an extending operation, leaks into the cushion pressure chamber 6 via a gap at the piston seal 50 located at the outer circumference of the piston 30. Thus, the hydraulic fluid collected in the cushion pressure chamber 6 and the air chamber 7 increases gradually, and when the liquid surface level of the hydraulic fluid rises above the upper end of the return pipe 9, the hydraulic fluid starts to flow down into the return pipe 9. Once the pressure in the air chamber 7 rises to a level exceeding a predetermined value, the check valve 8 opens and any excess hydraulic fluid collected in the return pipe 9 is allowed to travel back into the drive pressure chamber 5 through the communicating passage 19. Through these measures, it is ensured that the liquid surface level of the hydraulic fluid collected in the cushion pressure chamber 6 and the air chamber 7 is kept near the upper end of the return pipe 9. Consequently, the hydraulic fluid is retained in the cushion pressure chamber 6 and the air chamber 7 in a quantity needed to impart a desirable cushioning effect at a uniform extending stroke end of the liquid-operated cylinder 1 at all times.

The piston seal 50 fitted at the piston 30 in slidable contact with the inner circumferential surface 11 of the cylinder tube 10 may fail to fully wipe the liquid film formed on the inner circumferential surface 11 and allow it to remain over a significant thickness when the liquid-operated cylinder 1 is engaged in an extending operation and the piston 30 moves upward. Under such circumstances, as the liquid-operated cylinder 1 repeatedly extends and contracts, small quantities of hydraulic fluid may leak from the cushion pressure chamber 6 into the drive pressure chamber 5, and the quantity of hydraulic fluid collected in the cushion pressure chamber 6 may eventually become insufficient.

Figure 3:
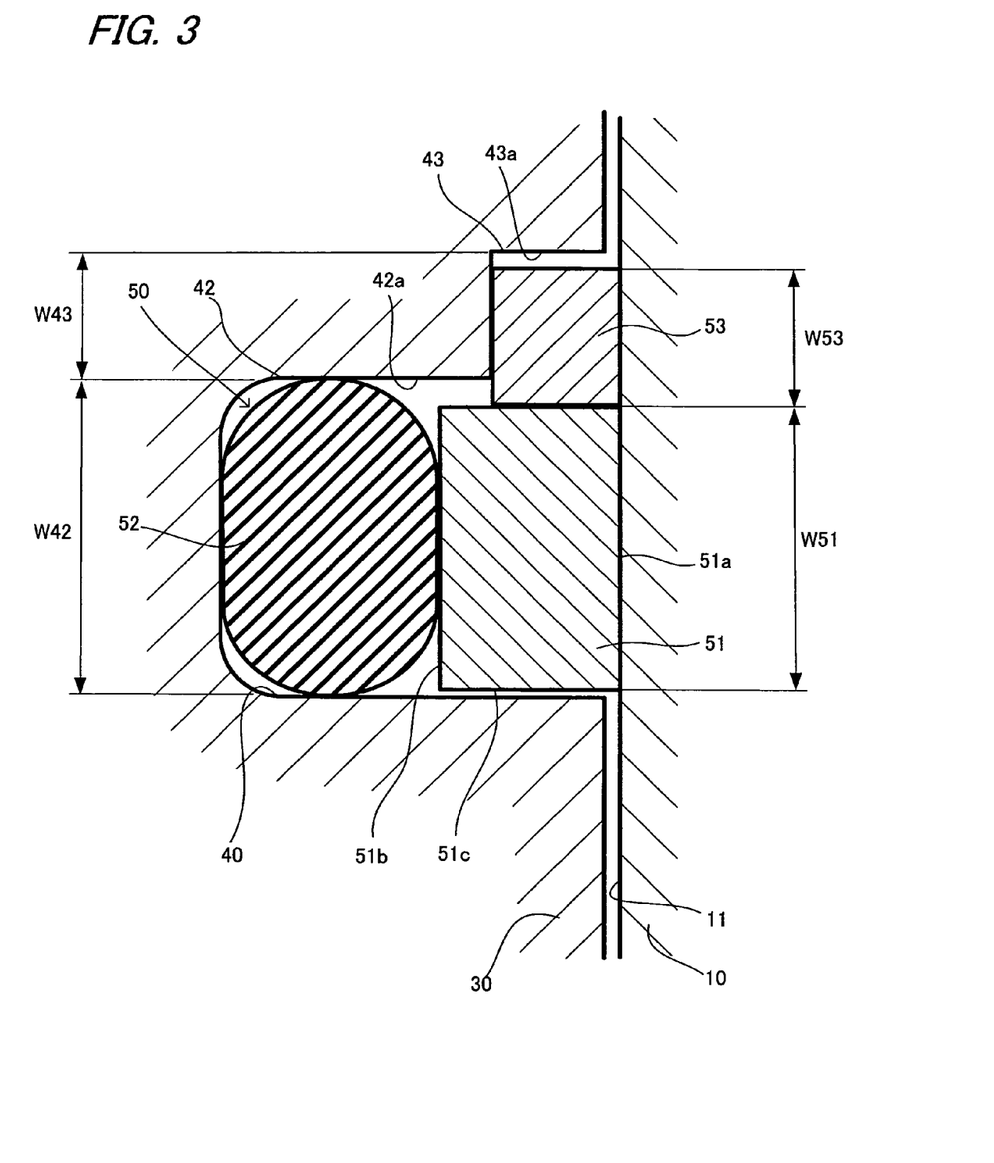
FIG. 3 is a sectional view showing part of the liquid-operated cylinder in an enlargement.

In order to address this issue, the piston seal 50 includes a main seal ring 51 that slidably contacts the inner circumferential surface 11 of the cylinder tube 10, an O-ring 52 that presses the main seal ring 51 against the inner circumferential surface 11 of the cylinder tube 10 and a liquid film-wiping sub-seal ring 53 that is disposed next to the main seal ring 51 at an upper position (toward the cushion pressure chamber 6) relative to the main seal ring 51 and slidably contacts the inner circumferential surface 11 of the cylinder tube 10.

A housing groove 40, in which the piston seal 50 is housed, is formed at the outer circumference of the piston 30. The housing groove 40 includes a main housing groove 42 where the main seal ring 51 is housed and a sub-housing groove 43 where the liquid film-wiping sub-seal ring 53 is housed.

FIG. 3 is a sectional view of the piston seal 50 and the surrounding area. The main seal ring 51, which has a rectangular section, is formed in a ring shape by using a resin material such as PTFE (polytetra-fluoroethylene).

The main seal ring 51 is a single-piece ring with no joint. When the main seal ring 51 is mounted within the main housing groove 42 formed at the piston 30, an outer circumferential surface 51a of the main seal ring 51 slidably contacts the inner circumferential surface 11 of the cylinder tube 10 over the entire circumference thereof.

The O-ring 52, which has a round cross section, is formed in a ring shape by using a rubber material.

The O-ring 52, which is placed in the main housing groove 42 further inward (further rearward) relative to the main seal ring 51, presses against an inner circumferential surface 51b of the main seal ring 51.

The liquid film-wiping sub-seal ring 53, which has a rectangular section, is formed in a ring shape by using a resin material such as nylon. However, the sub-seal ring 53 may be constituted of a resin material other than nylon, as long as it assures hardness equal to or greater than that of the material constituting the main seal ring 51.

The sub-seal ring 53 assumes a ring shape with bias cut abutting ends (not shown) and it is placed in the sub-housing groove 43 at the piston 30 by widening the space between the abutting ends. The surfaces of the abutting ends are angled relative to the axis of the liquid-operated cylinder 1. The surfaces of the abutting ends of the sub-seal ring 53 mounted in the sub-housing groove 43 formed at the piston 30, are in contact with each other, with an outer circumferential surface 53a of the sub-seal ring 53 slidably contacting, over its entire circumference, the inner circumferential surface 11 of the cylinder tube 10.

The dimension (ring thickness) of the section of the sub-seal ring 53, measured along the radial direction extending perpendicular to the axis of the liquid-operated cylinder 1, is smaller than that of the main seal ring 51.

The depth of the sub-housing groove 43, measured along the radial direction extending perpendicular to the axis of the liquid-operated cylinder 1, is smaller than the depth of the main housing groove 42.

The main housing groove 42 assumes a groove width, measured along the axis of the liquid-operated cylinder 1, that is greater than the width of the main seal ring 51. Namely, a relationship expressed as; W42>W51 exists, with W42 representing the groove width of the main housing groove 42 and W51 representing the ring width of the main seal ring 51.

The sub-housing groove 43 assumes a groove width, measured along the axis of the liquid-operated cylinder 1, that is smaller than the width of the sub-seal ring 53. Namely, a relationship expressed as; W43<W53 exists, with W43 representing the groove width of the sub-housing groove 43 and W53 representing the ring width of the sub-seal ring 53.

The O-ring 52 is mounted further inside the main housing groove 42 (over an area where the opening of the sub-housing groove 43 is not present) so as to take up a position further inside (further rearward) relative to the main seal ring 51.

When the liquid-operated cylinder 1 is engaged in an extending operation, the piston 30 and the piston rod 20 are caused to move upward along the axial direction as indicated in FIG. 2 by the pressure of the hydraulic fluid guided into the drive pressure chamber 5. The load is lifted via the fork operating by interlocking with the piston rod 20.

Figure 4:
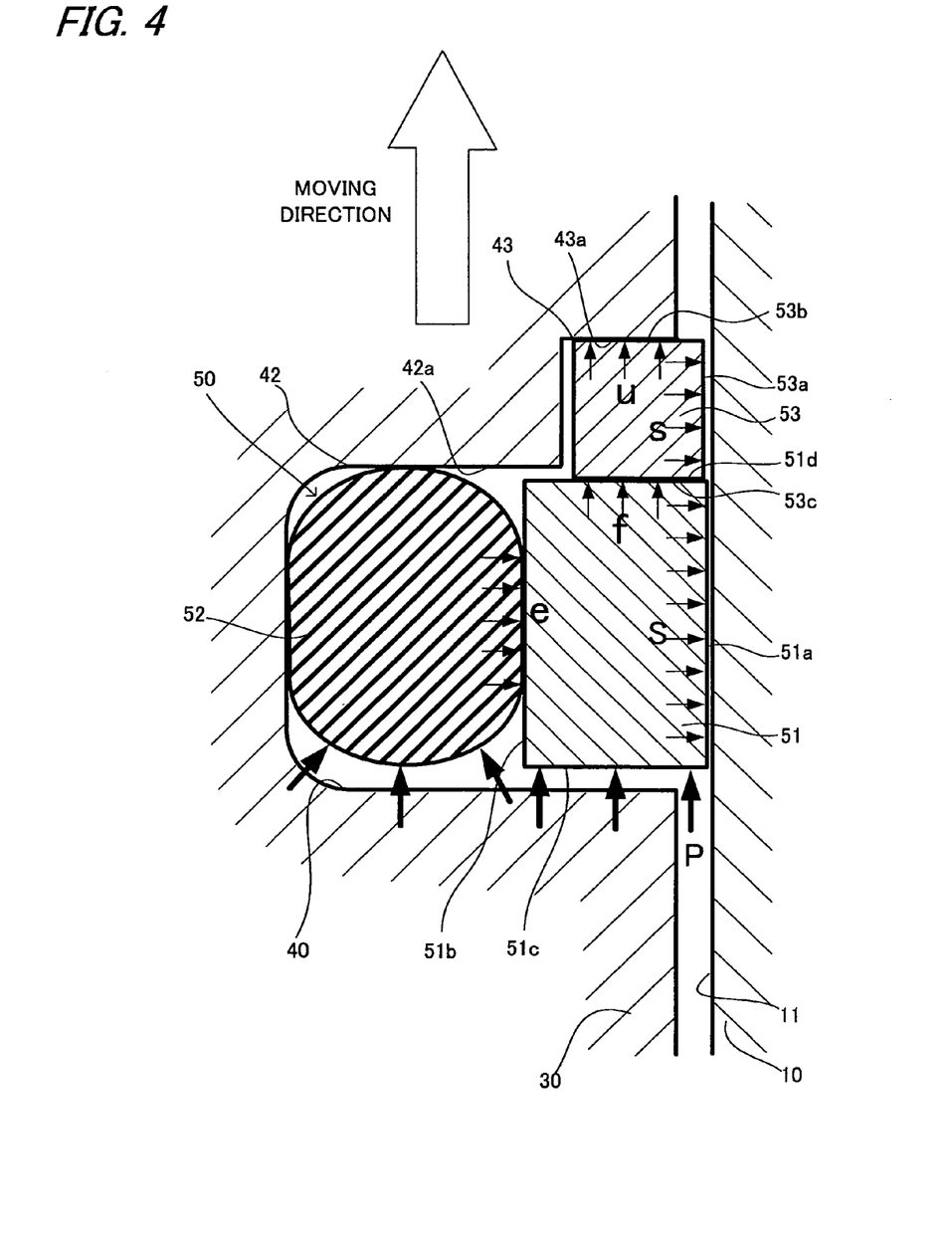
FIG. 4 is a sectional view showing part of the liquid-operated cylinder engaged in an extending operation in an enlargement.

FIG. 4 is a sectional view of the piston seal 50 slidably contacting the inner circumferential surface 11 of the cylinder tube 10 when the liquid-operated cylinder 1 is engaged in an extending operation and the piston 30 moves upward.

A high pressure P of the hydraulic fluid, which is guided from the drive pressure chamber 5, is applied to the main seal ring 51 and the O-ring 52 from below, as indicated by arrows in FIG. 4.

The hydraulic fluid pressure P compresses the O-ring 52 against an end surface 42a of the main housing groove 42. As a result, an elastic restorative force e is applied to an inner circumferential surface 51b of the main seal ring 51 as indicated by arrows in FIG. 4, and thus, the main seal ring 51 is pressed firmly against the inner circumferential surface 11 of the cylinder tube 10 with a surface pressure S.

In addition, with the hydraulic fluid pressure P applied to a lower end surface 51c of the main seal ring 51, the main seal ring 51 presses on a lower end surface 53c of the sub-seal ring 53, projecting out of the sub-housing groove 43, with a surface pressure f, as indicated by arrows in FIG. 4. As a result, an upper end surface 53b of the sub-seal ring 53 is pressed against a groove wall surface 43a of the sub-housing groove 43 with a surface pressure u, to come into full contact with the groove wall surface 43a without allowing any gap to be formed therebetween.

At the same time, the sub-seal ring 53 is compressed in the space between the groove wall surface 43a of the sub-housing groove 43 and an upper end surface 51d of the main seal ring 51. Such compression of the sub-seal ring 53 induces elastic deformation or causes the abutting end surfaces to slide against each other along an opening direction. Consequently, the sub-seal ring 53 expands along the radius of the liquid-operated cylinder 1 and the outer circumferential surface 53a of the sub-seal ring 53 is pressed against the inner circumferential surface 11 of the cylinder tube 10.

When the piston 30 moves upward during an extending operation of the liquid-operated cylinder 1, the sub-seal ring 53, subjected to a force imparted from the main seal ring 51, is pressed against the inner circumferential surface 11 of the cylinder tube 10. The sub-seal ring 53 in this state wipes off the hydraulic fluid while leaving a hydraulic fluid film of an even thickness over the inner circumferential surface 11 of the cylinder tube 10. Following the action of the sub-seal ring 53, the main seal ring 51 further wipes off the hydraulic fluid film at the inner circumferential surface 11 of the cylinder tube 10, while receiving a pressing force imparted from the O-ring 52 which is elastic-ally deformed by the high-pressure P of the hydraulic fluid guided from the drive pressure chamber 5. Through this process, when the piston 30 moves upward, the quantity of hydraulic fluid to flow into the drive pressure chamber 5 can be kept down to an acceptably low level by retaining the hydraulic fluid in the cushion pressure chamber 6.

When the liquid-operated cylinder 1 is engaged in a contracting operation, during which the piston 30 descends, the pressure P of the hydraulic fluid, guided from the drive pressure chamber 5 to the main seal ring 51, becomes lower. As the hydraulic fluid pressure P becomes lower, the forces with which the main seal ring 51 and the sub-seal ring 53 are pressed against the inner circumferential surface 11 of the cylinder tube 10 lessen. Thus, the quantity of the hydraulic fluid film wiped off via the main seal ring 51 and the sub-seal ring 53 from the inner circumferential surface 11 of the cylinder tube 10 becomes less than the quantity of the hydraulic fluid film wiped off during the extending operation of the liquid-operated cylinder 1. Consequently, it is ensured that an optimal quantity of hydraulic fluid flows from the drive pressure chamber 5 into the cushion pressure chamber 6.

As described above, the quantity of hydraulic fluid flowing from the cushion pressure chamber 6 to the drive pressure chamber 5 during the extending operation of the liquid-operated cylinder 1 is smaller than the quantity of hydraulic fluid flowing from the drive pressure chamber 5 into the cushion pressure chamber 6 during the contracting operation of the liquid-operated cylinder 1. Thus, as the liquid-operated cylinder 1 repeatedly extends and contracts, the cushion pressure chamber 6 is replenished with the hydraulic fluid and it is ensured that the hydraulic fluid retained in the cushion pressure chamber 6 never runs short.

As more hydraulic fluid is collected in the cushion pressure chamber 6 and the air chamber 7 and the surface level of the hydraulic fluid eventually rises above the upper end of the return pipe 9, the hydraulic fluid starts to flow down into the return pipe 9. As a result, any excess hydraulic fluid having been collected into the return pipe 9 is allowed to travel back into the drive pressure chamber 5 via the check valve 8. Through these measures, it is ensured that the required quantity of hydraulic fluid is maintained at all times in the cushion pressure chamber 6 and the air chamber 7.

The liquid-operated cylinder 1 achieved in the embodiment described above includes the drive pressure chamber 5 and the cushion pressure chamber 6 defined by the piston 30 in the space within the cylinder tube 10 and is caused to extend by the pressurized hydraulic fluid guided into the drive pressure chamber 5. The piston seal 50 includes the main seal ring 51, which slidably contacts the inner circumferential surface 11 of the cylinder tube 10. The piston seal 50 includes the O-ring 52, which applies a force that causes the outer circumference (outer circumferential surface 51a) of the main seal ring 51 to move further toward the inner circumference surface 11 of the cylinder tube 10 by pressing against the inner circumference (inner circumferential surface 51b) of the main seal ring 51. Further, the piston seal 50 includes the sub-seal ring 53, which is disposed in parallel to the main seal ring 51 further toward the cushion pressure chamber 6. The sub-seal ring 53 is pushed by the main seal ring 51, as the pressure from the drive pressure chamber 5 is applied to the main seal ring 51, to slidably contact the inner circumferential surface 11 of the cylinder tube 10.

When the pressure from the drive pressure chamber 5 is applied and the piston 30 is displaced, the sub-seal ring 53 of the piston seal 50 structured as described above first wipes off the hydraulic fluid film at the inner circumferential surface 11 of the cylinder tube 10 and the main seal ring 51 of the piston seal 50 becomes pressed even harder against the inner circumferential surface 11 of the cylinder tube 10. Since the main seal ring 51 further wipes off the hydraulic fluid film, the flow of the hydraulic fluid from the cushion pressure chamber 6 into the drive pressure chamber 5 is fully inhibited and thus, the required quantity of hydraulic fluid can be retained in the cushion pressure chamber 6.

In the embodiment described above, the piston seal 50 is housed in the housing groove 40 formed at the outer circumference of the piston 30. The housing groove 40 is made up with the main housing groove 42, in which the main seal ring 51 is disposed, and the sub-housing groove 43, in which the sub-seal ring 53 is disposed. The sub-housing groove 43 having a smaller groove depth compared to the main housing groove 42 ranges continuously, via a stage, to the main housing groove 42. The sub-seal ring 53 has the ring width W53 greater than the groove width W43 of the sub-housing groove 43. When the pressure from the drive pressure chamber 5 is applied, the sub-seal ring 53 is pressed, along the direction in which the groove width ranges, by the main seal ring 51 housed within the main housing groove 42.

In the structure described above, the lower end surface 53c of the sub-seal ring 53 projects out of the sub-housing groove 43. Thus, the sub-seal ring 53, subjected to the force imparted from the main seal ring 51, is pressed against the inner circumferential surface 11 of the cylinder tube 10 together with the main seal ring 51. This allows the sub-seal ring 53 to evenly wipe off the hydraulic fluid film from the inner circumferential surface 11 of the cylinder tube 10. As a result, the flow of the hydraulic fluid from the cushion pressure chamber 6 into the drive pressure chamber 5 is fully inhibited and thus, the required quantity of hydraulic fluid can be retained in the cushion pressure chamber 6.

In the embodiment, the main housing groove 42 is located further toward the drive pressure chamber 5, whereas the sub-housing groove 43 is located further toward the cushion pressure chamber 6. The thickness of the main seal ring 51 disposed in the main housing groove 42 is greater than the thickness of the sub-seal ring 53 disposed in the sub-housing groove 43.

As described above, the quantity of hydraulic fluid flowing from the cushion pressure chamber 6 to the drive pressure chamber 5 during the extending operation of the liquid-operated cylinder 1 adopting the structure described above is smaller than the quantity of hydraulic fluid flowing from the drive pressure chamber 5 into the cushion pressure chamber 6 during the contracting operation of the liquid-operated cylinder 1. Thus, as the liquid-operated cylinder 1 repeatedly extends and contracts, the cushion pressure chamber 6 is replenished with hydraulic fluid and it is ensured that the hydraulic fluid retained in the cushion pressure chamber 6 never runs short.

The upper end surface 51d of the main seal ring 51 comes into contact with the entire lower end surface 53c of the sub-seal ring 53. As a result, the sub-seal ring 53 is allowed to undergo the process of elastic deformation and expand in an effective manner. The main seal ring 51 is thus allowed to evenly wipe off the hydraulic fluid film from the inner circumferential surface 11 of the cylinder tube 10.

An alternative embodiment may include a pair of liquid film-wiping sub-seal rings, disposed above and below the main seal ring.

The piston in such an embodiment should include a main housing groove where the main seal ring and the O-ring are housed, and an upper sub-housing groove and a lower sub-housing groove, where the upper liquid film-wiping sub-seal ring and the lower liquid film-wiping sub-seal ring are respectively housed.

The upper and lower sub-housing grooves will assume a dimension (groove width) smaller than that of the liquid film-wiping sub-seal rings, measured along the axis of the liquid-operated cylinder.

As this liquid-operated cylinder is engaged in an extending operation, the upper liquid film-wiping sub-seal ring will wipe off the hydraulic fluid film at the inner circumferential surface of the cylinder tube. When the liquid-operated cylinder is engaged in a contracting operation, however, the lower liquid film-wiping sub-seal ring will wipe off the hydraulic fluid film at the inner circumferential surface of the cylinder tube.

Figure 5:
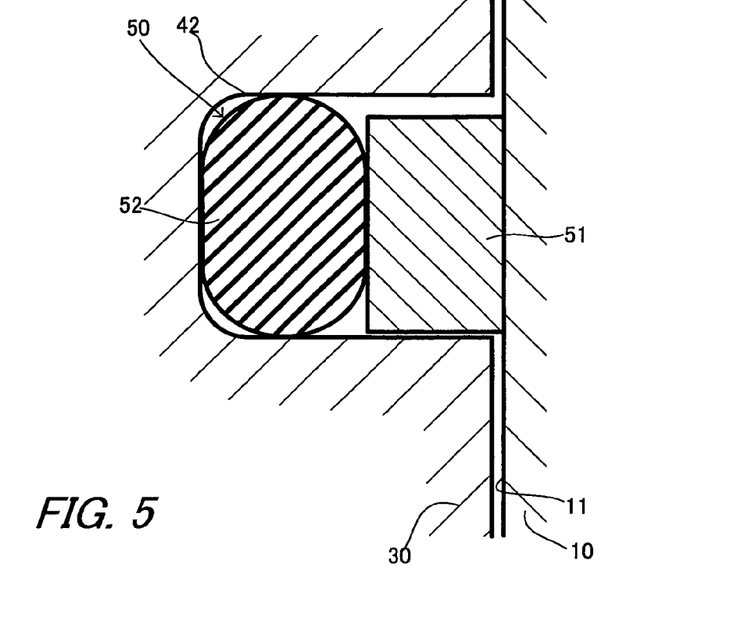
FIG. 5 is a sectional view showing part of a liquid-operated cylinder in the related art in an enlargement.

The piston seal disclosed in JP 2000-2207A, shown in FIG. 5, includes a seal ring 51 that slidably contacts an inner circumferential surface 11 of a cylinder tube 10 and an O-ring 52 that presses the seal ring 51 against the inner circumferential surface 11 of the cylinder tube 10.

The seal ring 51 and the O-ring 52 are set in a housing groove 42 at a piston 30, side-by-side along the radius of the piston 30.

As the piston 30 moves up during a hydraulic cylinder extending operation, an elastic restorative force of the O-ring 52 presses the seal ring 51 against the inner circumferential surface 11 of a cylinder tube 10 and a cushion pressure is thus created.

Figure 6:
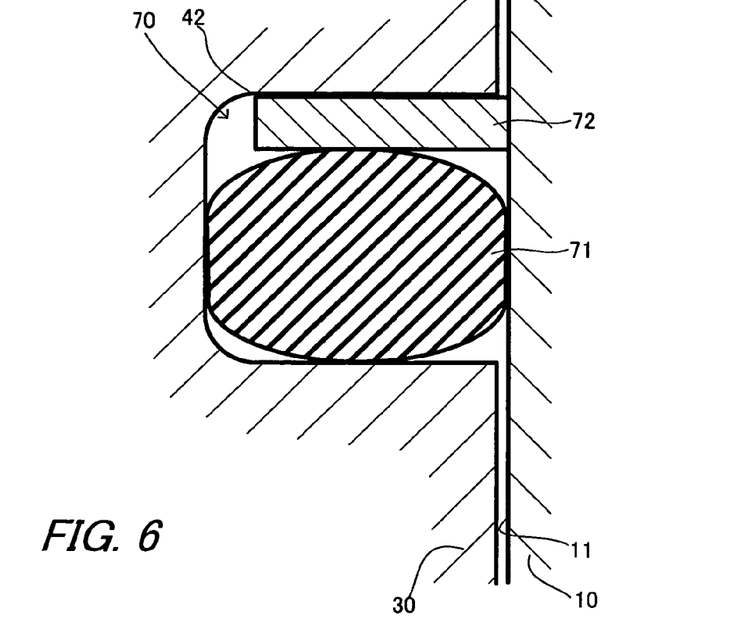
FIG. 6 is a sectional view showing part of a liquid-operated cylinder in the related art in an enlargement.

As shown in FIG. 6, the piston seal 70 disclosed in JP10-122205A includes a rubber seal ring 71 that slidably contacts an inner circumferential surface 11 of a cylinder tube 10 and a backup ring 72 constituted of resin.

The seal ring 71 and the backup ring 72 are mounted side-by-side along the axis of the piston 30 within a housing groove 42 formed at the piston 30.

As the piston 30 moves up during a hydraulic cylinder extending operation, the elastic restorative force of the rubber seal ring 71 causes it to be pressed against the inner circumferential surface 11 of the cylinder tube 10 and a cushion pressure is thus created.

At this time, the backup ring 72 comes into contact with the seal ring 71 and thus prevents the rubber seal ring 71 from being pulled out of the housing groove 42.

The embodiment described earlier is distinguishable in that as the pressure from the drive pressure chamber is applied, causing displacement of the piston, the hydraulic fluid film at the inner circumferential surface of the cylinder tube is first wiped off by the sub-seal ring while the main seal ring is pressed even harder against the inner circumferential surface of the cylinder tube. As the main seal ring further wipes off the hydraulic fluid film, the flow of the hydraulic fluid from the cushion pressure chamber into the drive pressure chamber is fully inhibited and a desirable quantity of hydraulic fluid can be retained in the cushion pressure chamber.

The entire contents of Japanese Patent Applications JP2009-195214 (filed Aug. 26, 2009) are incorporated herein by reference.

Although the invention has been described above by reference to a certain embodiment of the invention, the invention is not limited to the embodiment described above. Modifications and variations of the embodiment described above will occur to those skilled in the art, in light of the above teachings. The scope of the invention is defined with reference to the following claims.

What is claimed is:

1. A liquid-operated cylinder that is extended by a pressurized hydraulic fluid guided into a drive pressure chamber, comprising:
   a cylinder tube;
   a piston that defines the drive pressure chamber and a cushion pressure chamber inside the cylinder tube; and
   a piston seal that is disposed at an outer circumference of the piston and slidably contacts an inner circumferential surface of the cylinder tube,
   the piston seal comprising:
   a main seal ring that slidably contacts the inner circumferential surface of the cylinder tube, the main seal ring being constituted of a resin material;
   an O-ring configured to impart a force causing an outer circumference of the main seal ring to move closer to the inner circumferential surface of the cylinder tube by pressing onto an inner circumference of the main seal ring; and
   a sub-seal ring that is disposed parallel to the main seal ring at a position further toward the cushion pressure chamber and is pressed by the main seal ring, as pressure from the drive pressure chamber is applied to the main seal ring, to slidably contact the inner circumferential surface of the cylinder tube, the sub-seal ring being constituted of a resin material having a hardness that is equal to or greater than a hardness of the resin material constituting the main seal ring;
   the piston seal being disposed inside a housing groove formed at an outer circumference of the piston;
   the housing groove including a main housing groove in which the main seal ring is housed and a sub-housing groove in which the sub-seal ring is housed; and
   along a longitudinal axis of the liquid-operated cylinder, the sub-seal ring having a ring width greater than a groove width of the sub-housing groove, the sub-seal ring being pushed in a direction along the groove width by the main seal ring that is housed inside the main housing groove as the pressure from the drive pressure chamber is applied to the main seal ring.

2. The liquid-operated cylinder as defined in claim 1, wherein the sub-housing groove assumes a smaller groove depth than the main housing groove and ranges continuously, via a stage, to the main housing groove.

* * * * *